United States Patent
Rueger et al.

(10) Patent No.: US 7,019,436 B2
(45) Date of Patent: Mar. 28, 2006

(54) TIME- AND EVENT-CONTROLLED ACTIVATION SYSTEM FOR CHARGING AND DISCHARGING PIEZOELECTRIC ELEMENTS

(75) Inventors: Johannes-Jörg Rueger, Vaihingen/enz (DE); Alexander Hock, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 859 days.

(21) Appl. No.: 09/824,167

(22) Filed: Apr. 2, 2001

(65) Prior Publication Data

US 2001/0035697 A1    Nov. 1, 2001

(30) Foreign Application Priority Data

Apr. 1, 2000 (EP) .................... 00106962

(51) Int. Cl.
*H01L 41/08*    (2006.01)
(52) U.S. Cl. .................. 310/316.03; 310/317
(58) Field of Classification Search ........ 310/316.03, 310/317

See application file for complete search history.

(56) References Cited

U.S. PATENT DOCUMENTS

| | | | | |
|---|---|---|---|---|
| 4,732,129 A | * | 3/1988 | Takigawa et al. | 123/478 |
| 5,208,505 A | * | 5/1993 | Mitsuyasu | 310/317 |
| 5,862,431 A | * | 1/1999 | Christensen | 310/330 |
| 6,067,955 A | * | 5/2000 | Boecking | 123/299 |
| 6,081,061 A | * | 6/2000 | Reineke et al. | 310/316.03 |
| 6,147,433 A | * | 11/2000 | Reineke et al. | 310/316.03 |
| 6,196,193 B1 | * | 3/2001 | Heinz et al. | 123/459 |

FOREIGN PATENT DOCUMENTS

| | | |
|---|---|---|
| DE | 197 42073 | 3/1999 |
| DE | 2334164 A * | 8/1999 |
| DE | 19805184 A1 * | 8/1999 |
| DE | 19854789 A1 * | 8/1999 |
| EP | 0 371 469 | 6/1990 |
| EP | 0 379 182 | 7/1990 |
| EP | 0871230 A1 * | 10/1998 |

* cited by examiner

*Primary Examiner*—Thomas M. Dougherty
(74) *Attorney, Agent, or Firm*—Kenyon & Kenyon LLP

(57) ABSTRACT

The invention describes an apparatus and a method for charging or discharging a piezoelectric element of a system, e.g., for a fuel injection system. The method and apparatus are characterized in that the current of a system is regulated as a function of a time characteristic and an event characteristic to achieve an effective low absolute average current.

37 Claims, 11 Drawing Sheets

TIME- AND EVENT-CONTROLLED ACTIVATION SYSTEM FOR CHARGING AND DISCHARGING PIEZOELECTRIC ELEMENTS

The present invention concerns an apparatus as defined in the preamble of claim 1 or as defined in the preamble of claim 2 and a method as defined in the preamble of claims 12, 13, 17, and an application for use as defined in the preamble of claim 18; i.e., an apparatus and a method and an application for use for charging and discharging a piezoelectric element, both charging and discharging being accomplished at least partially via an element acting substantially as an inductance for the charge and discharge currents.

The present piezoelectric elements being considered in more detail are, in particular but not exclusively, piezoelectric elements used as actuators. Piezoelectric elements can be used for such purposes because, as is known, they possess the property of contracting or expanding as a function of a voltage applied thereto.

The practical implementation of actuators using piezoelectric elements is advantageous in particular if the actuator in question must perform rapid and/or frequent movements.

The use of piezoelectric elements as actuators proves to be advantageous, inter alia, in fuel injection nozzles for internal combustion engines. See references EP 0 371 469 B1 and EP 0 379 182 B1, incorporated herein by reference, regarding the usability of piezoelectric elements in fuel injection nozzles.

FIG. 15 is a schematic representation of a fuel injection system using a piezoelectric element 2010 as an actuator. Referring to FIG. 15, the piezoelectric element 2010 is electrically energized to expand and contract in response to a given activation voltage. The piezoelectric element 2010 is coupled to a piston 2015. In the expanded state, the piezoelectric element 2010 causes the piston 2015 to protrude into a hydraulic adapter 2020 which contains a hydraulic fluid, for example fuel. As a result of the piezoelectric element's expansion, a double acting control valve 2025 is hydraulically pushed away from hydraulic adapter 2020 and the valve plug 2035 is extended away from a first closed position 2040. The combination of double acting control valve 2025 and hollow bore 2050 is often referred to as double acting, double seat valve for the reason that when piezoelectric element 2010 is in an unexcited state, the double acting control valve 2025 rests in its first closed position 2040. On the other hand, when the piezoelectric element 2010 is fully extended, it rests in its second closed position 2030. The later position of valve plug 2035 is schematically represented with ghost lines in FIG. 15.

The fuel injection system comprises an injection needle 2070 allowing for injection of fuel from a pressurized fuel supply line 2060 into the cylinder (not shown). When the piezoelectric element 2010 is unexcited or when it is fully extended, the double acting control valve 2025 rests respectively in its first closed position 2040 or in its second closed position 2030. In either case, the hydraulic rail pressure maintains injection needle 2070 at a closed position. Thus, the fuel mixture does not enter into the cylinder (not shown). Conversely, when the piezoelectric element 2010 is excited such that double acting control valve 2025 is in the so-called mid-position with respect to the hollow bore 2050, then there is a pressure drop in the pressurized fuel supply line 2060. This pressure drop results in a pressure differential in the pressurized fuel supply line 2060 between the top and the bottom of the injection needle 2070 so that the injection needle 2070 is lifted allowing for fuel injection into the cylinder (not shown).

German patent application Nos. DE 197 42 073 A1 and DE 197 29 844 A1, which are described below and are incorporated herein by reference in their entirety, disclose piezoelectric elements with double acting, double seat valves for controlling injection needles in a fuel injection system.

Piezoelectric elements are capacitative loads which, as already partially alluded to above, contract and expand in accordance with the particular charge state or the voltage occurring therein or applied thereto.

Two fundamental principles are known for charging and discharging a piezoelectric element; that is, charging and discharging via an ohmic resistance and charging and discharging via a coil. In those cases, both the ohmic resistance and the coil serve, among other purposes, to limit the charge current occurring during charging, and the discharge current occurring during discharging.

The first variant, i.e., charging and discharging via an ohmic resistance, is illustrated in FIG. 9.

The piezoelectric element to be charged or discharged, labeled in FIG. 9 with the reference character 101, is connected to a charge transistor 102 and a discharge transistor 103.

Charge transistor 102 is activated by a charge amplifier 104 and in the conductive state connects piezoelectric element 101 to a positive supply voltage; discharge transistor 103 is activated by a discharge amplifier 105 and in the conductive state connects piezoelectric element 101 to ground.

When charge transistor 102 is in the conductive state, a charge current flows through it and charges piezoelectric element 101. As the charging of piezoelectric element 101 increases, the voltage occurring in it rises, and its external dimensions also change accordingly. Inhibition of charge transistor 102, i.e., interruption or termination of the charging operation, causes the charge stored in piezoelectric element 101 and the voltage thereby established in it, and thus also the existing external dimensions of piezoelectric element 101, to be retained in substantially unchanged fashion.

When discharge transistor 103 is in the conductive state, a discharge current flows through and discharges piezoelectric element 101. As piezoelectric element 101 becomes increasingly discharged, the voltage occurring in it decreases, and its external dimensions also change accordingly. Inhibition of discharge transistor 103, i.e., interruption or termination of the discharging operation, causes the charge still stored in piezoelectric element 101 and the voltage thereby established in it, and thus also the existing external dimensions of piezoelectric element 101, to be retained.

Charge transistor 102 and discharge transistor 103 act, in terms of the charge current and discharge current, like controllable ohmic resistances. The resulting controllability of the charge current and discharge current makes it possible for the charging operation and discharging operation to be made to occur exactly as desired. However, the charge current flowing through charge transistor 102 and the discharge current flowing through discharge transistor 103 generate not inconsiderable power losses therein. The energy loss in the transistors for each charge/discharge cycle is at least twice as great as the energy stored in piezoelectric element 101. This high energy loss results in very pronounced heating of charge transistor 102 and discharge transistor 103.

For this reason principally, among many others, the second variant, already mentioned above, for charging and discharging the piezoelectric element—i.e. charging and discharging via a coil—is often used; a practical implementation of this second variant is illustrated in FIG. 10.

The piezoelectric element to be charged and discharged, which is labeled in FIG. 10 with the reference character 201, is a component of a charge current circuit that can be closed by a charge switch 202, and of a discharge current circuit that can be closed by a discharge switch 206; the charge current circuit comprises a series circuit made up of a charge switch 202, a diode 203, a charge coil 204, piezoelectric element 201, and a voltage source 205. The discharge current circuit comprises a series circuit made up of a discharge switch 206, a diode 207, a discharge coil 208, and piezoelectric element 201.

Diode 203 of the charge current circuit prevents any current that might discharge the piezoelectric element from flowing in the charge current circuit.

Diode 207 of the discharge current circuit prevents any current that might charge the piezoelectric element from flowing in the discharge current circuit.

When charge switch 202 (normally open) is closed, a charge current flows in the charge current circuit and causes piezoelectric element 201 to be charged; the charge stored in piezoelectric element 201 and the voltage thereby occurring in it, and thus also the existing external dimensions of piezoelectric element 201, are retained in substantially unchanged fashion when the charge switch is opened again.

When discharge switch 206 (normally open) is closed, a discharge current flows in the discharge current circuit and causes piezoelectric element 201 to be discharged; the charge status of piezoelectric element 201, the voltage thereby occurring in the piezoelectric element 201 and the existing external dimensions of piezoelectric element 201, are retained in substantially unchanged fashion when the discharge switch is opened again.

Charge coil 204 and discharge coil 206 represent an element that acts substantially as an inductance for the charge current and discharge current; charging coil 204 and piezoelectric element 201, and discharge coil 206 and piezoelectric element 201, constitute an LC series oscillator circuit during charging and discharging, respectively, of the piezoelectric element 201.

See EP 0 371 469 B1 and EP 0 379 18-2 B1, mentioned above for a discussion of certain circuits being used for charging and discharging piezoelectric elements.

The apparatuses and methods known from the aforesaid documents and described above in terms of their fundamental principles are apparatuses as defined in the preamble of claim 1 or claim 2, and methods as defined in the preamble of claim 9 or claim 10 or claim 14.

Since the circuits as described in FIG. 10 contain no appreciable ohmic resistances in either the charge current circuit or the discharge current circuit, the heat energy generated by charging and discharging of the piezoelectric element, i.e., by the flow of charge current and discharge current through ohmic resistances is extremely small.

A relatively large amount of space is required for the practical implementation of such circuits, in particular because of the not inconsiderable size of charging coil 204 and discharge coil 208.

The fundamental task when activating piezoelectric elements or piezoactuators is to charge and discharge the actuator within a predefined time.

In the case of the activation system described, for example, this can be accomplished by regulating the current within a current band, the current band being defined by two setpoints. The current band must be selected so that the average current flow satisfies the equation $$I_{average}=(C_P \times U_P)/T_A$$

where $C_P$ is the piezo capacitance, $U_P$ the difference between initial and desired voltage at the piezo or piezoelectric element during charging and discharge, and $T_A$ the time within which the piezo or piezoelectric element or piezoelectric element must be charged or discharged.

More recent applications have smaller and smaller actuators and therefore lower and lower piezo or piezoelectric element capacitances; however, the same time for charging or discharging is being demanded. These requirements tend to result in a much lower average current, for example, approximately 3 A or less.

With the existing activation system, however, there are limits to the reduction in average current. The current gradient for practical coil applications and piezo or piezoelectric element capacitance, for example, is very high, depending on the inductance and the piezo or piezoelectric element's capacitance, being up to 10 A/μs.

Since the activation logic and the switches used for current control have switching times of approximately 1 μs, this means that the reference current is exceeded by up to 10 A. The average current thus can be limited to only about 5 A. Greater inductivity, in order to limit the current, could be helpful here, but this appears impractical because it tends to increase size.

An object of the present invention is to develop an apparatus as defined in the preamble of claim 1 or claim 2 and a method as defined in the preamble of claim 12 or claim 13 or claim 17 and an application for use as defined in the preamble of claim 18, in such a way that achieves arbitrarily low average currents during the charging and discharging of piezoelectric elements or piezoactuators.

Another object of the present invention is to develop a method as defined in the preamble of claim 12 or claim 13 or claim 17 and an apparatus as defined in the preamble of claim 1 or claim 2 and an application for use as defined in the preamble of claim 18, in such a way that efficient charging and discharging of piezoelectric elements is made possible therewith, while achieving arbitrarily low average currents during the charging and discharging of piezoelectric elements.

The present invention provides for achievement of arbitrarily low average currents during the charging and discharging of piezoelectric elements or piezoelectric elements or piezoactuators. In the present invention, the activation system can be modified so that the current is not regulated within a certain current band but can also exhibits gaps when necessary, allowing a low average current during the charging and discharging of the piezoelectric elements.

Provision is made therein for the charge current and discharge current to be at least partially passed through the same element acting as an inductance, and for at least one element acting as an inductance to be arranged in such a way that both the charge current and the discharge current can be passed through it.

The at least partial charging and discharging of the piezoelectric element via an element acting substantially as an inductance for the charging or discharge current, for example, via a coil or an element acting as a coil, makes it possible to keep the charge current path and the discharge current path substantially free of electrical loads; as a result, on the one hand very little energy is consumed (because the power loss is low and because the energy withdrawn from the piezoelectric element during discharging is returned to the voltage source or can be temporarily stored in a capacitor), and on the other hand the heating of the circuit occurring during charging and discharging can be kept very low. As a result, the individual components (including the power supply) can be designed for relatively low power levels, and the measures previously necessary for cooling either can be entirely omitted or in any event can be of very limited scope.

Because the charge current and the discharge current are passed through the same element acting as an inductance, i.e., because the charge current and discharge current are passed, for example through the same coil or through an element acting as a coil, it is moreover possible to minimize the number of components, more precisely the number of elements acting as an inductance; it is evident that, because of the not inconsiderable size of these elements, this has a very positive effect on the size of the arrangement in question.

It is thereby possible to perform efficient charging and discharging of piezoelectric elements even in confined spaces and within predefined time.

The apparatus according to the present invention is easier and cheaper to manufacture than is the case with conventional apparatuses.

Advantageous developments of the invention are the subject matter of the dependent claims.

The invention will be explained below in more detail with reference to exemplary embodiments, referring to the drawings in which.

The piezoelectric elements whose charging and discharging operations are described in more detail below are usable, for example, as actuators in fuel injection nozzles (in particular in so-called common rail injectors) of internal combustion engines. There is, however, absolutely no limitation to such a use of the piezoelectric elements; the piezoelectric elements can fundamentally be used in any apparatus for any purpose.

It is assumed that the piezoelectric elements expand in response to charging and contract in response to discharging. The invention is, however, of course also applicable if precisely the opposite is the case.

Figure 1:
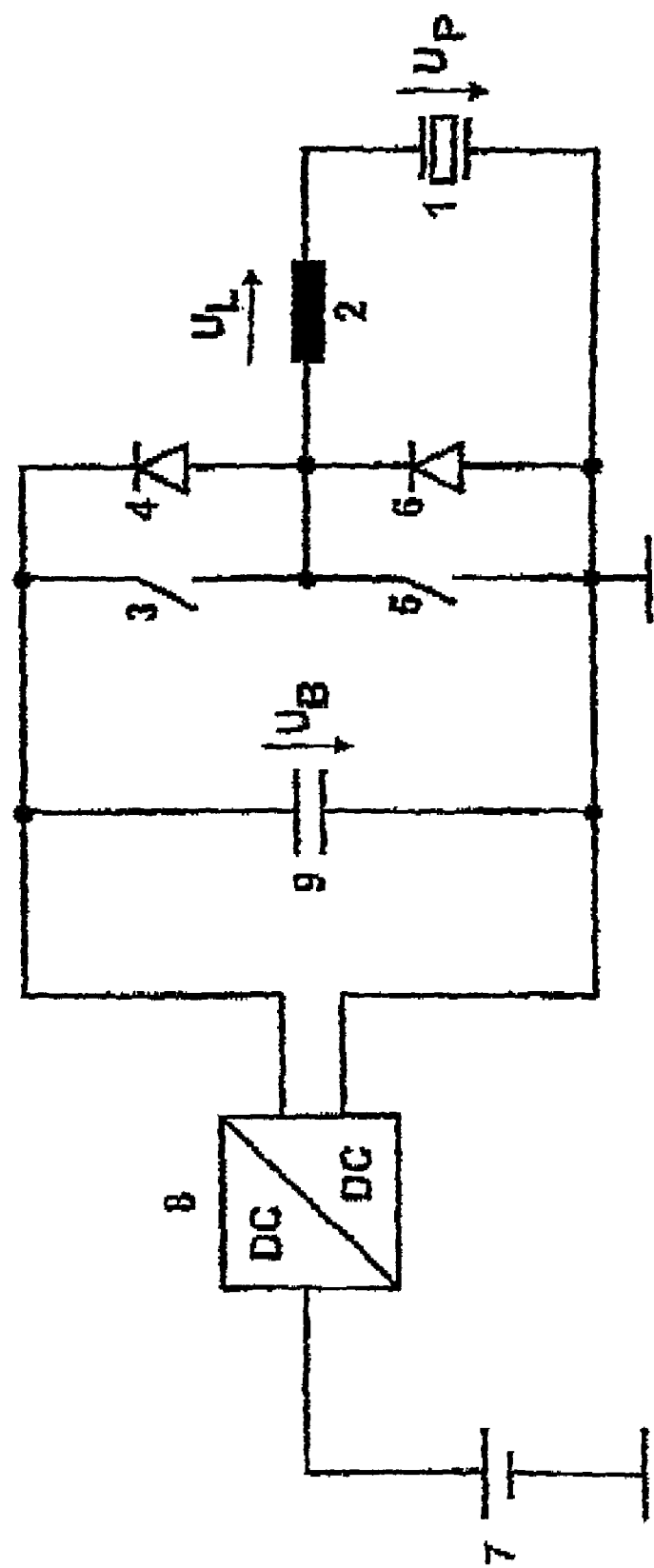
FIG. 1 shows a circuit according to the present invention, suitable for charging and discharging a piezoelectric element using the method according to the present invention.

FIG. 1 shows an embodiment of a circuit for carrying out the method according to present invention for charging and discharging a piezoelectric element. The piezoelectric element is to be charged in the example in question. One of the terminals of piezoelectric element 1 is permanently connected to ground, i.e., is connected to a first pole of a voltage source; the other terminal of piezoelectric element is connected to the second pole of the voltage source via a coil 2 and a parallel circuit made up of a charge switch 3 and a diode 4, and to the first pole of the voltage source via coil 2 and a parallel circuit made up of a discharge switch 5 and a diode 6.

The voltage source comprises a battery 7 (for example, a motor vehicle battery), a DC voltage converter 8 downstream therefrom, and a capacitor 9, serving as buffer capacitor, downstream. By way of this arrangement, the battery voltage (for example, 12 V) is converted into essentially any other DC voltage and is made available as the supply voltage.

In the example being considered, charging and discharging of piezoelectric element 1 take place in cycled fashion. In other words, charge switch 3 and discharge switch 5 are repeatedly closed and opened during the charging and discharging operations.

Figure 2:
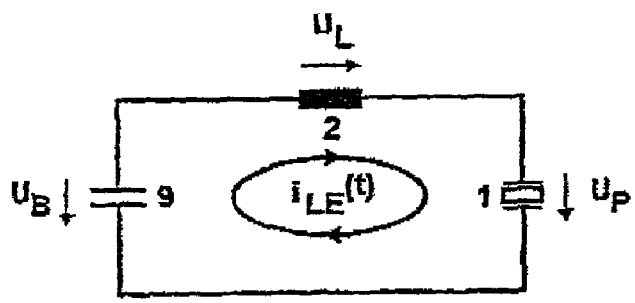
FIG. 2 shows a depiction to explain the conditions occurring during a first charging phase (charge switch 3 closed) in the circuit according to FIG. 1.
Figure 3:
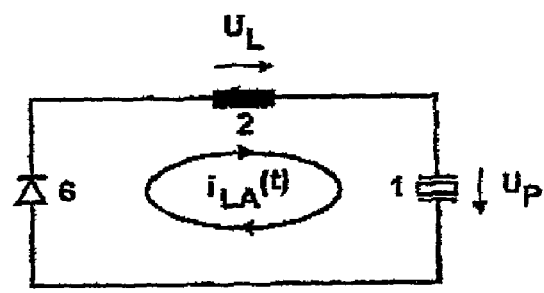
FIG. 3 shows a depiction to explain the conditions occurring during a second charging phase (charge switch 3 open again) in the circuit according to FIG. 1.
Figure 4:
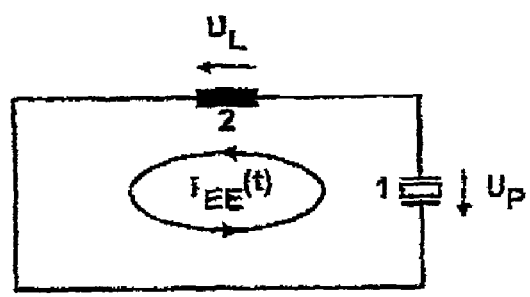
FIG. 4 shows a depiction to explain the conditions occurring during a first discharging phase (discharge switch 5 closed) in the circuit according to FIG. 1.
Figure 5:
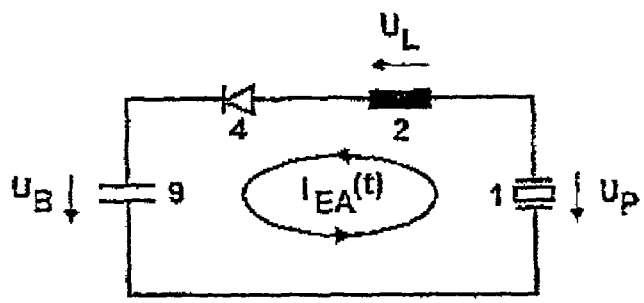
FIG. 5 shows a depiction to explain the conditions occurring during a second discharging phase (discharge switch 5 open again) in the circuit according to FIG. 1.

The conditions occurring as a result are explained below with reference to FIGS. 2 through 5, of which FIGS. 2 and 3 illustrate the charging of piezoelectric element 1, and FIGS. 4 and 5 illustrate the discharging of piezoelectric element 1.

Charge switch 3 and discharge switch 5 are open if and as long as no charging or discharging of piezoelectric element 1 is occurring. In this state, the circuit shown in FIG. 1 is in a steady-state condition, i.e., piezoelectric element 1 retains its charge state in substantially unchanged fashion, and no currents flow.

With the onset of charging of piezoelectric element 1, charge switch 3 is repeatedly closed and opened; discharge switch 5 remains open.

When charge switch 3 is closed, the conditions shown in FIG. 2 occur, i.e. a closed circuit comprising a series circuit made up of piezoelectric element 1, capacitor 9, and coil 2 is formed, in which a current $i_{LE}(t)$ flows as indicated by arrows in FIG. 2. The result of this current flow is that energy is stored in coil 2. The energy flow into coil 2 is effected by the positive potential difference between capacitor 9 and piezoelectric element 1.

When charge switch 3 opens shortly (for example, a few μs) after it has closed, the conditions shown in FIG. 3 occur: a closed circuit comprising a series circuit made up of piezoelectric element 1, diode 6, and coil 2 is formed, in which a current $i_{LA}(t)$ flows as indicated by arrows in FIG. 3. The result of this current flow is that energy stored in coil 2 flows into piezoelectric element 1. Corresponding to the energy delivery to the piezoelectric element, the voltage occurring in the latter, and its external dimensions, increase. Once energy transport has taken place from coil 2 to piezoelectric element 1, the steady-state condition of the circuit, as shown in FIG. 1 and already described, is once again attained.

At that time, or earlier, or later (depending on the desired time profile of the charging operation), charge switch 3 is once again closed and opened again, so that the processes described above are repeated. As a result of the re-closing and re-opening of charge switch 3, the energy stored in piezoelectric element 1 increases (the energy already stored in the piezoelectric element and the newly delivered energy are added together), and the voltage occurring at the piezoelectric element, and its external dimensions, accordingly increase.

If the aforementioned closing and opening of charge switch 3 are repeated numerous times, the voltage occurring at the piezoelectric element, and the expansion of the piezoelectric element, rise in steps (see the depiction in FIG. 6, explained later).

Once charge switch 3 has closed and opened a predefined number of times, and/or once piezoelectric element 1 has reached the desired charge state, charging of the piezoelectric element is terminated by leaving charge switch 3 open.

When piezoelectric element 1 is to be discharged again, this is done by repeatedly closing and opening discharge switch 5 while charge switch 3 remains open.

When discharge switch 5 is closed, the conditions shown in FIG. 4 occur: a closed circuit comprising a series circuit made up of piezoelectric element 1 and coil 2 is formed, in which a current $i_{EE}(t)$ flows as indicated by arrows in the FIG. 4. The result of this current flow is that the energy (a portion thereof) stored in the piezoelectric element is transported into coil 2. Corresponding to the energy transfer from piezoelectric element 1 to coil 2, the voltage occurring at the piezoelectric element, and its external dimensions, decrease.

When discharge switch 5 opens shortly (for example, a few μs) after it has closed, the conditions shown in FIG. 5 occur: a closed circuit comprising a series circuit made up of piezoelectric element 1, capacitor 9, diode 4, and coil 2 is formed, in which a current $i_{EA}(t)$ flows as indicated by arrows in FIG. 5. The result of this current flow is that energy stored in coil 2 is fed back into capacitor 9. Once energy transport has taken place from coil 2 to capacitor 9, the steady-state condition of the circuit, as shown in FIG. 1 and already described, is once again attained.

At that time, or earlier, or later (depending on the desired time profile of the discharging operation), the discharge switch 5 is once again closed and opened again, so that the processes described above are repeated. As a result of the re-closing and re-opening of discharge switch 5, the energy stored in piezoelectric element 1 decreases further, and the voltage occurring at the piezoelectric element, and its external dimensions, also accordingly decrease.

Figure 6:
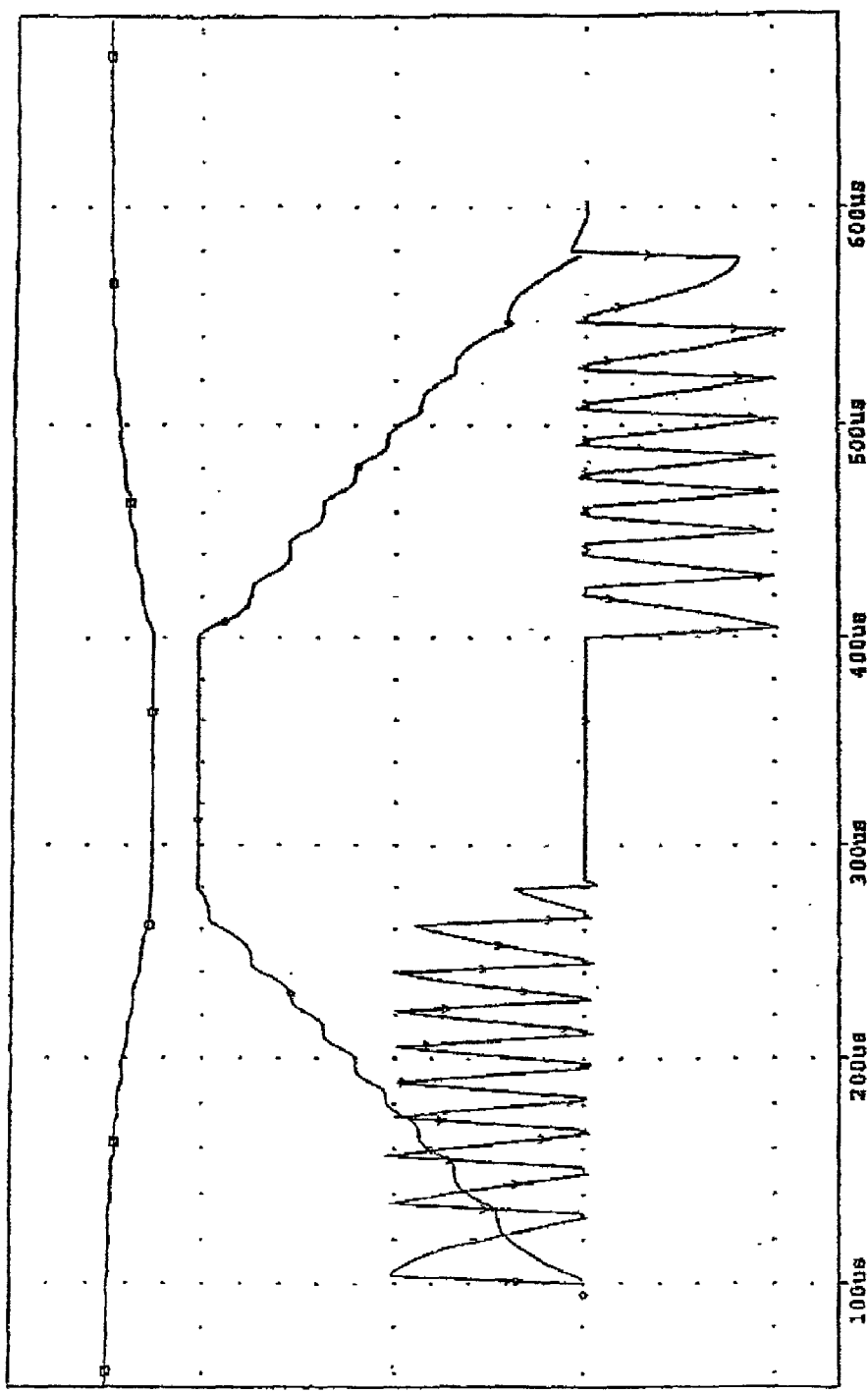
FIG. 6 shows the change over time in the voltage and current values occurring during operation of the circuit according to FIG. 1.

If the aforementioned closing and opening of discharge switch 5 are repeated numerous times, the voltage occurring at the piezoelectric element, and the expansion of the piezoelectric element, decrease in steps (see the depiction in FIG. 6).

Once discharge switch 5 has closed and opened a predefined number of times, and/or once the piezoelectric element has reached the desired discharge state, discharging of the piezoelectric element is terminated by leaving discharge switch 5 open.

Operation of the circuit shown in FIG. 1, or more precisely the charging and discharging of piezoelectric element 1 as described above, results in the current and voltage profiles shown in FIG. 6.

The curves depicted in FIG. 6 are labeled with symbols representing their measured variables. The symbols used represent:

□: the voltage $U_B$ occurring at capacitor 9;
◊: the voltage occurring at piezoelectric element 1; and
∇: the current flowing through coil 2.

The current and voltage curves shown in FIG. 6 illustrate the charging process (in the range from approximately 100 μs to 300 μs on the time scale) and discharging process (in the range from approximately 400 μs to 600 μs on the time scale). As is evident from FIG. 6, the voltage occurring at piezoelectric element 1 has a homogeneous and well-controlled profile.

At the same time, the circuit with which charging and discharging of the piezoelectric element is effected—more precisely, the circuit shown in FIG. 1—is of extremely simple configuration and optimally efficient. Three factors contribute to this, namely 1) that charging and discharging are accomplished through one and the same coil (namely coil 2);
2) that the energy loss due to heat generation in ohmic resistances is negligibly small; and
3) that the energy stored in the piezoelectric element is fed essentially completely back into capacitor 9, and is thus available for immediate reuse.

The first factor makes it possible to minimize the number of components, in particular the number of coils (which are inherently relatively large). The second and third factors make it possible to design battery 7 and DC converter 8 for relatively low power levels.

All of the aforesaid factors, whether alone or in combination, create or at least contribute to the possibility of accommodating the circuit provided for charging and discharging piezoelectric elements in the smallest possible space, and of minimizing costs for the manufacture and operation thereof.

Using the method described in essence above for charging and discharging piezoelectric elements, and the circuit suitable for carrying out that method, it is possible to charge and discharge a plurality of piezoelectric elements in succession rather than only one piezoelectric element in succession.

Figure 7:
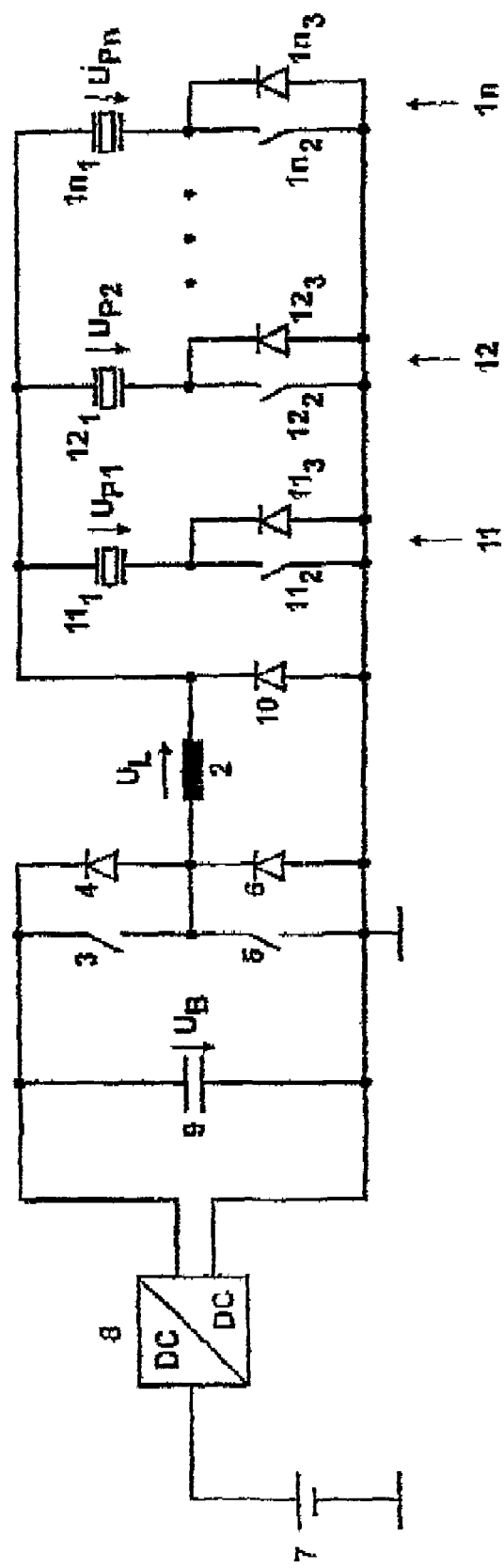
FIG. 7 shows a circuit according to the present invention for sequential charging and discharging of multiple piezoelectric elements using the method according to the present invention.

A circuit which makes that possible is depicted in FIG. 7.

The circuit shown in FIG. 7 is based on the circuit shown in FIG. 1; elements corresponding to one another are labeled with the same reference characters. The "only" piezoelectric element 1 according to FIG. 1 is replaced by a parallel circuit made up of a diode 10 and a plurality (n) of piezo or piezoelectric element branches 11, 12, . . . 1n, each piezo or piezoelectric element branch comprising a series circuit made up of a piezoelectric element $11_1, 12_1, \ldots 1n_1$ and a parallel circuit made up of a selector switch $11_2, 12_2, \ldots 1n_2$ and a diode $11_3, 12_3, \ldots 1n_3$.

Diode 10 prevents negative voltages from occurring at the piezoelectric elements, which might in some circumstances be damaged thereby.

The selector switch/diode pairs arranged in parallel in the individual piezo or piezoelectric element branches, i.e., selector switch $11_2$ and diode $11_3$ in piezo or piezoelectric element branch 11, selector switch $12_2$, and diode $12_3$ in piezo or piezoelectric element branch 12, and selector switch $1n_2$ and diode $1n_3$ in piezo or piezoelectric element branch 1n, can be implemented using electronic switches with parasitic diodes, for example MOSFETs or IGBTs.

Charging and discharging of piezoelectric elements $11_1, 12_1, \ldots 1n_1$, is accomplished in substantially the same way as charging and discharging of piezoelectric element 1 according to FIG. 1; i.e., for charging, charge switch 3 is repeatedly closed and opened, and for discharging, discharge switch 5 is repeatedly closed and opened.

The piezoelectric element or elements $11_1, 12_1, 1n_1$, that is or are charged upon repeated closing and opening of charge switch 3 is or are determined by selector switches $11_2, 12_2, \ldots 1n_2$; in each case, the piezoelectric elements $11_1, 12_1, \ldots 1n_1$ that are charged are all those whose selector switches $11_2, 12_2, \ldots 1n_2$ are closed during the repeated closing and opening of charge switch 3.

Selection of the piezoelectric elements $11_1, 12_1, \ldots 1n_1$ to be charged (by closing the associated selector switches $11_2, 12_2, \ldots 1n_2$), and cancellation of the selection (by opening the relevant switches), are generally accomplished outside the charging operation. In specific cases, if several of the piezoelectric elements $11_1, 12_1, \ldots 1n_1$ are to be charged simultaneously to different levels, opening and closing of selector switches $11_1, 12_2, \ldots 1n_2$ can also take place during the charging operation.

The operations occurring during charging of the selected piezoelectric elements $11_1, 12_1, \ldots 1n_1$ are substantially identical to the operations occurring in the case of the circuit shown in FIG. 1. FIGS. 2 and 3 and the explanations referring thereto are also valid; the only difference is that one or more of piezoelectric elements $11_1, 12_1, \ldots 1n_1$, rather than piezoelectric element 1, are charged.

Discharging of piezoelectric elements $11_1, 12_1, \ldots 1n_1$, takes place regardless of the position of the associated selector switches $11_2, 12_2, \ldots 1n_2$, since the discharge current that effects discharge of the piezoelectric elements can flow via the diodes $11_3, 12_3, \ldots 1n_3$ associated with the respective piezoelectric elements. The discharging operation therefore causes all the completely or partially charged piezoelectric elements $11_1, 12_1, \ldots 1n_1$ to be discharged.

The operations occurring during discharging of the piezoelectric elements $11_1, 12_1, \ldots 1n_1$ are substantially identical to the operations occurring in the case of the circuit shown in FIG. 1. FIGS. 4 and 5 and the explanations referring thereto are also valid; the only difference is that one or more of piezoelectric elements $11_1, 12_1, \ldots 1n_1$, rather than piezoelectric element 1, are discharged.

Figure 8:
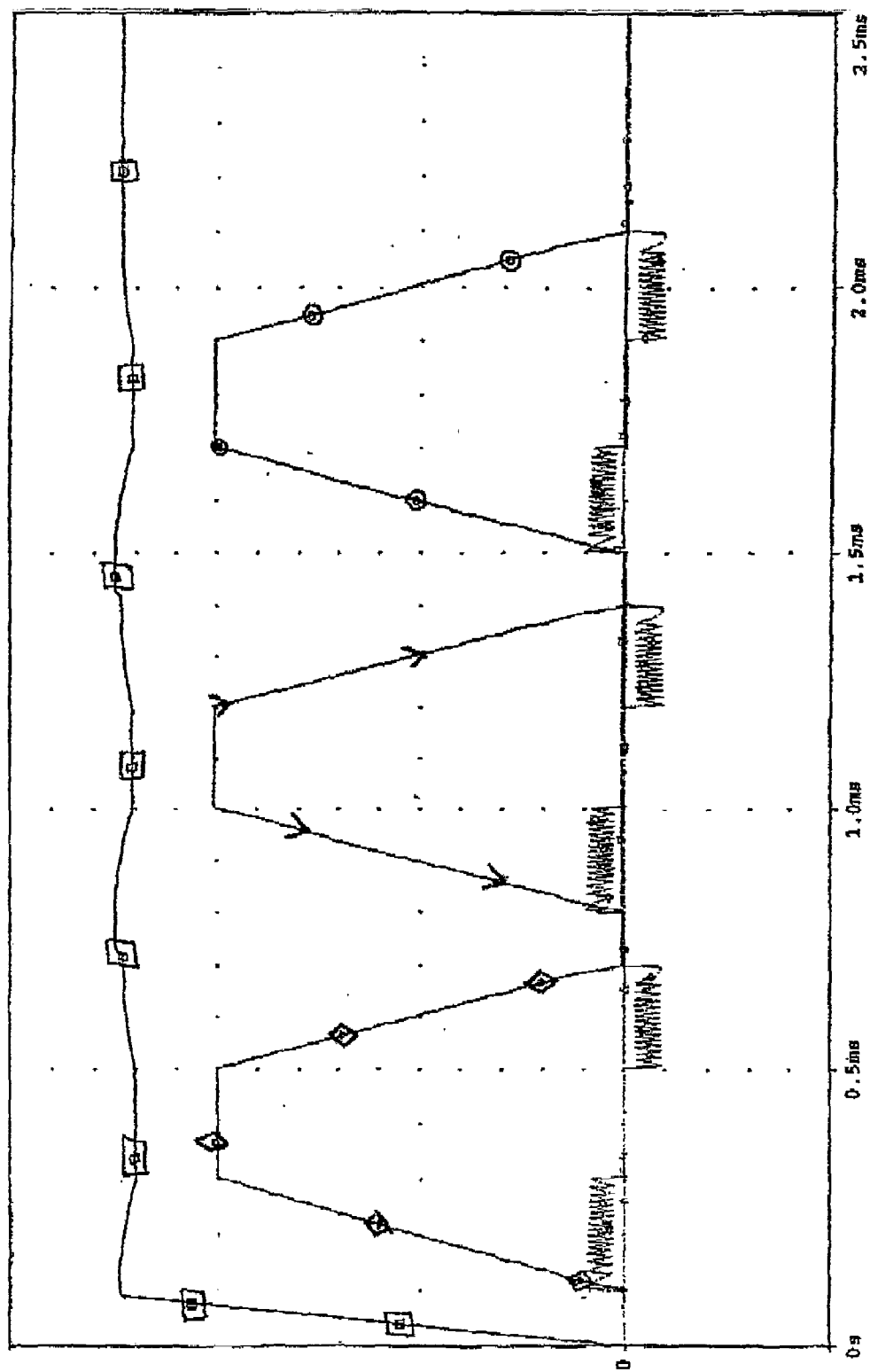
FIG. 8 shows the change over time in the voltage and current values occurring during operation of the circuit according to FIG. 7.
Figure 9:
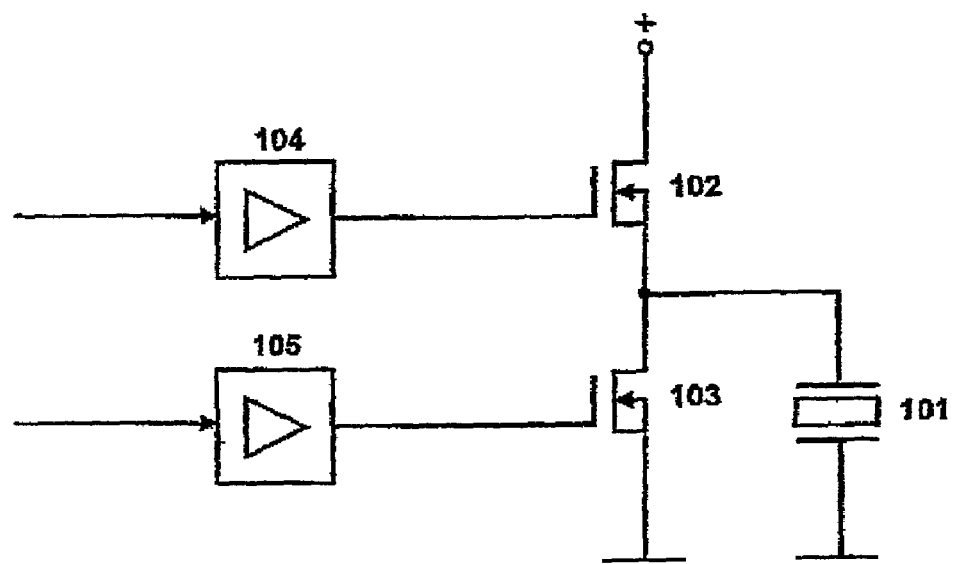
FIG. 9 shows a conventional circuit for charging and discharging a piezoelectric element via elements acting as ohmic resistances for the charging and discharge currents.
Figure 10:
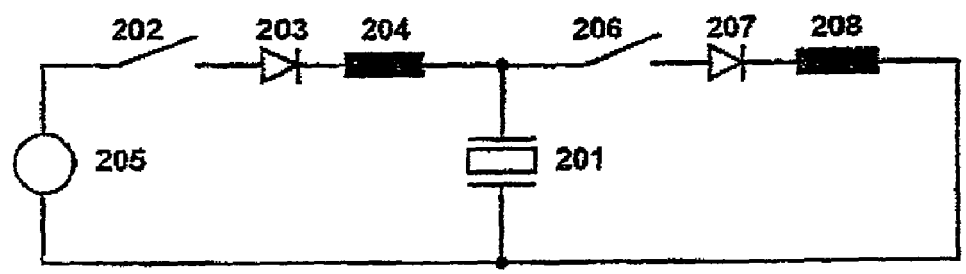
FIG. 10 shows a conventional circuit for charging and discharging a piezoelectric element via elements acting as coils for the charging and discharge currents.

If the circuit shown in FIG. 7 is operated in such a way that piezoelectric elements $11_1, 12_1, \ldots 1n_1$ are charged and discharged individually and successively as described above, the current and voltage profiles that result are those shown in FIG. 8.

The curves depicted in FIG. 8 are labeled with symbols representing their measured variables. The symbols used represent:

□: the voltage $U_B$ occurring at capacitor 9;
◇: the voltage occurring at piezoelectric element $11_1$;
V: the voltage occurring at piezoelectric element $12_1$; and
○: the voltage occurring at piezoelectric element $1n_1$.

The current and voltage profiles shown in FIG. 8 illustrate the charging and discharging operation for piezoelectric element $11_1$, (in the range from approximately 0.1 ms to 0.7 ms on the time scale), the charging and discharging operation for piezoelectric element $12_1$ (in the range from approximately 0.8 ms to 1.4 ms on the time scale), and the charging and discharging operation for piezoelectric element $1n_1$ (in the range from approximately 1.5 ms to 2.1 ms on the time scale); can be understood in looking at the configuration, function, and manner of operation of the circuit as shown in FIG. 7.

As is evident from FIG. 8, the voltage occurring at the piezoelectric elements has an almost linear and well-controlled profile.

At the same time, the circuit with which charging and discharging of the piezoelectric element is effected—more precisely, the circuit shown in FIG. 7—is of extremely simple configuration and optimally efficient. Once again, as was already the case with the circuit according to FIG. 1, the factors contributing to this are, principally, that charging and discharging are accomplished through one and the same coil (namely coil 2); that the energy loss due to heat generation in ohmic resistances is negligibly small; and that the energy stored in the piezoelectric element is fed essentially completely back into capacitor 9, and is thus available for immediate reuse.

The first factor once again makes it possible to minimize the number of components, in particular the number of coils (which are inherently relatively large). The second factor makes it possible to design the DC converter 8 for relatively low power levels.

All of the aforesaid factors, whether alone or in combination, create or at least contribute to the possibility of accommodating the circuit discussed above (the circuit according to FIG. 7) for charging and discharging piezoelectric elements in the smallest possible space, and of minimizing costs for the manufacture and operation thereof.

In each of the exemplary embodiments described, a coil was used as the element acting as an inductance. This does not, however, constitute any limitation. Other elements acting as an inductance, such as transmitters, transformers, etc. can (with appropriate modifications to the configuration and operation of the circuit) also be used instead of the coil.

There is also no limitation in terms of performing the charging and discharging operations in cycled fashion, as described. Charging and/or discharging can also, alternatively or additionally, be performed in other ways.

Provision could be made, inter alia, for performing the charging and/or discharging operations entirely or partially by way of one or more charging and/or discharging current circuits acting as oscillator circuits.

Figure 11:
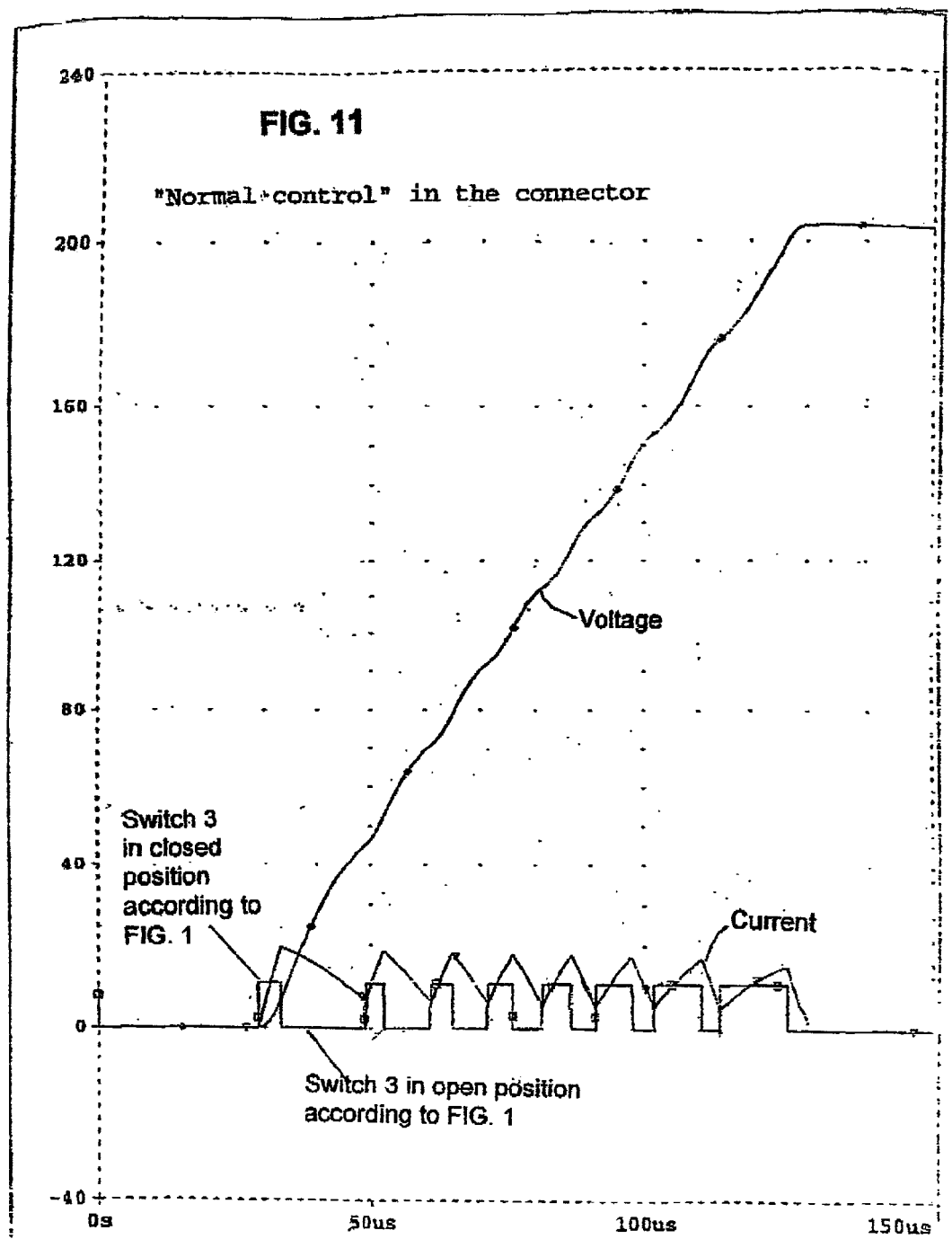
FIG. 11 shows a profile during charging of a piezoactuator disposed in a circuit.

FIG. 11 shows, by way of example, an example profile during charging of a piezoelectric element or piezoelectric element or piezoactuator, having a higher average current than that provided by the present invention.

In the present invention, instead of closing the charge switch 3 again after the current has fallen below the lower limit, and thus allowing the current to rise again, the activation system according to the present invention provides for generating, if necessary, a current that can exhibit gaps and thus results in a lower average current.

For any of the embodiments of the present invention, the present invention provides that a certain time delay or predefined time can be defined such that when a certain event occurs such as the current value is measured (for example, by a measuring unit or the like) as having a value below a predefined lower current value or as having a value above a predefined higher current value, then the charge or discharge switch is made to continue to remain off or on, respectively, until the certain time delay or predefined time occurs or runs, and then the charge or discharge switch (3, 5) is allowed to switch to on or off, respectively. More particularly, when the measured current value is equal to or less than the predefined lower current value, then the predefined time begins and runs. When the predefined time is complete or met, then the charge switch 3 switches from off to on. This, an embodiment of the present invention, provides that any desired average current can be achieved by varying the time period.

Three alternatives are proposed for this, their shared feature being, rather than a purely event-controlled control system ("events" being excursions above and below the current thresholds), an event- and time-controlled control system.

Figure 12:
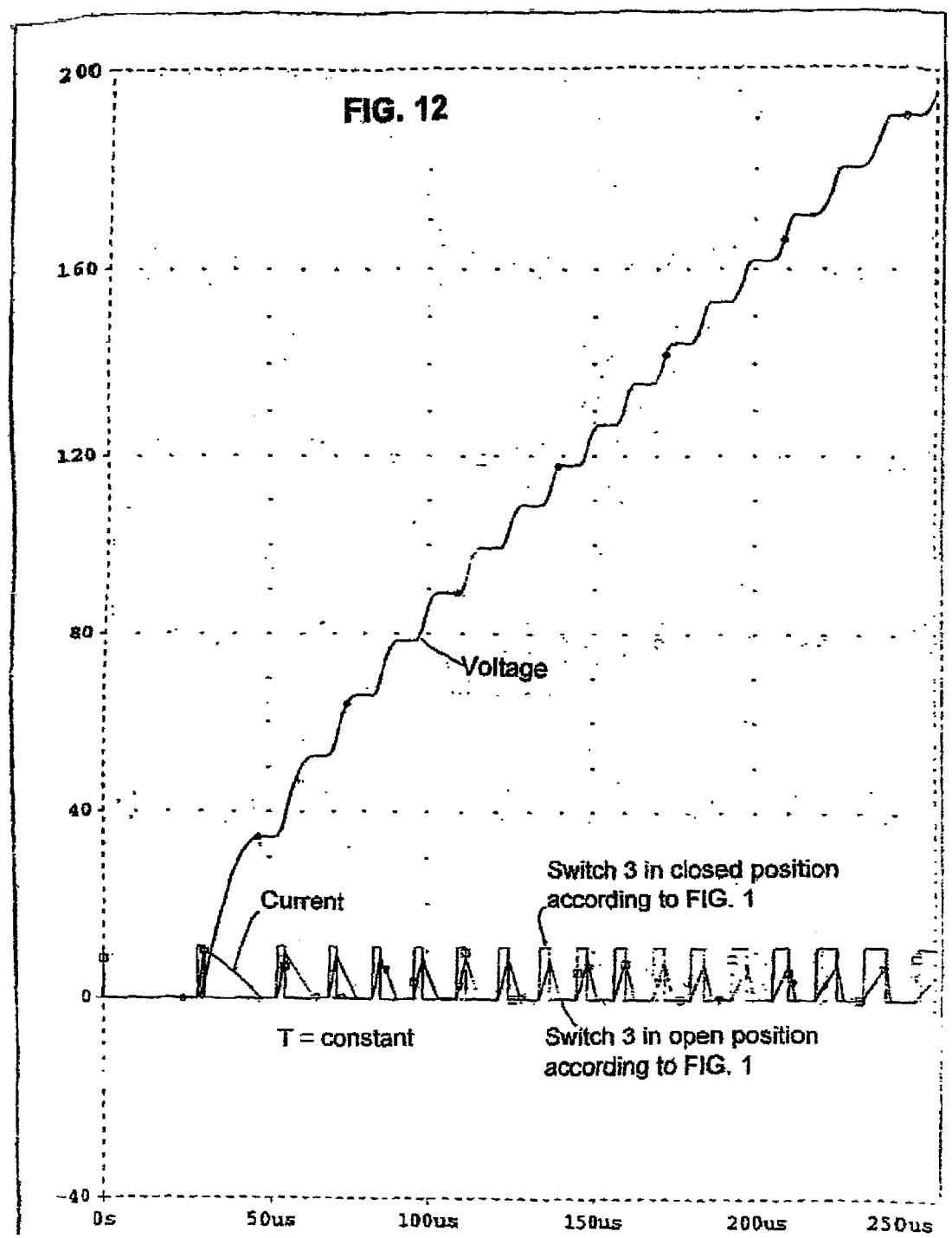
FIG. 12 shows an alternative embodiment of the present invention having a lower current threshold at 0 A, and a constant time t after reaching the low threshold until the charge switch 3 according to FIG. 1 is turned on again.

A first embodiment of the present invention provides, as an additional parameter, a time delay for switching the charge switch back on upon an excursion below the lower current threshold. In a special case, this lower current threshold can be zero as shown in FIG. 12. If this time period is set at zero, there is no change compared with the previous situation. FIG. 12 shows an example of the first embodiment of the present invention having a time of about 5 μs and a lower current threshold at 0 A. Any desired average current can be achieved by varying the time period.

Figure 13:
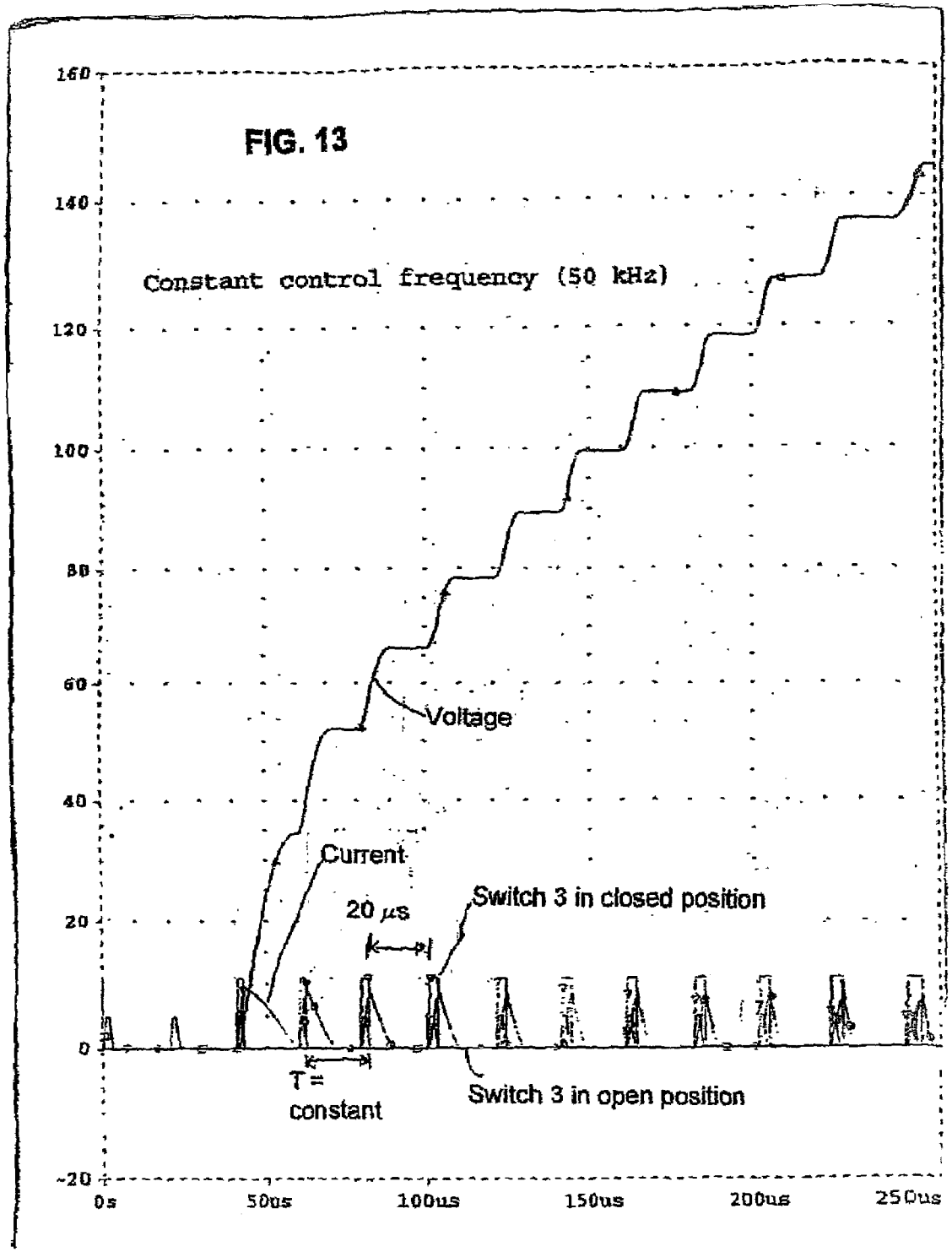
FIG. 13 shows an alternative embodiment of the present invention having an upper current threshold and wherein the charge switch is turned on with a certain but constant frequency.

A second embodiment of the present invention, as shown in FIG. 13, provides that the lower current threshold is omitted. Instead, a square-wave signal with a certain frequency is used to switch on the charge switch. It is switched off, as before, when the upper current threshold is exceeded. This guarantees that the maximum current that occurs cannot cause damage to the components.

Figure 14:
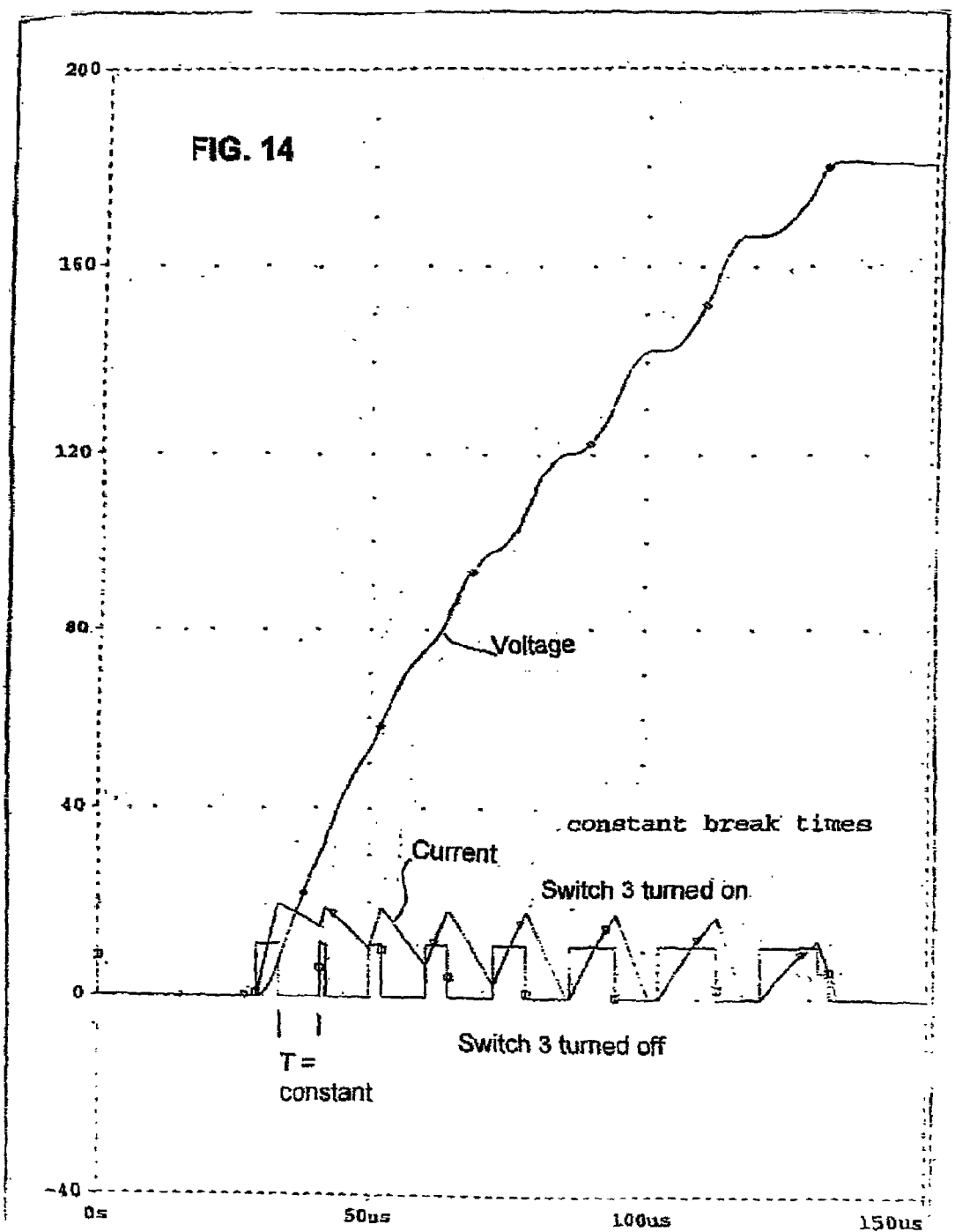
FIG. 14 shows an another alternative embodiment of the present invention having a predefined time delay between reading the current threshold and turning on the charge switch again.
Figure 15:
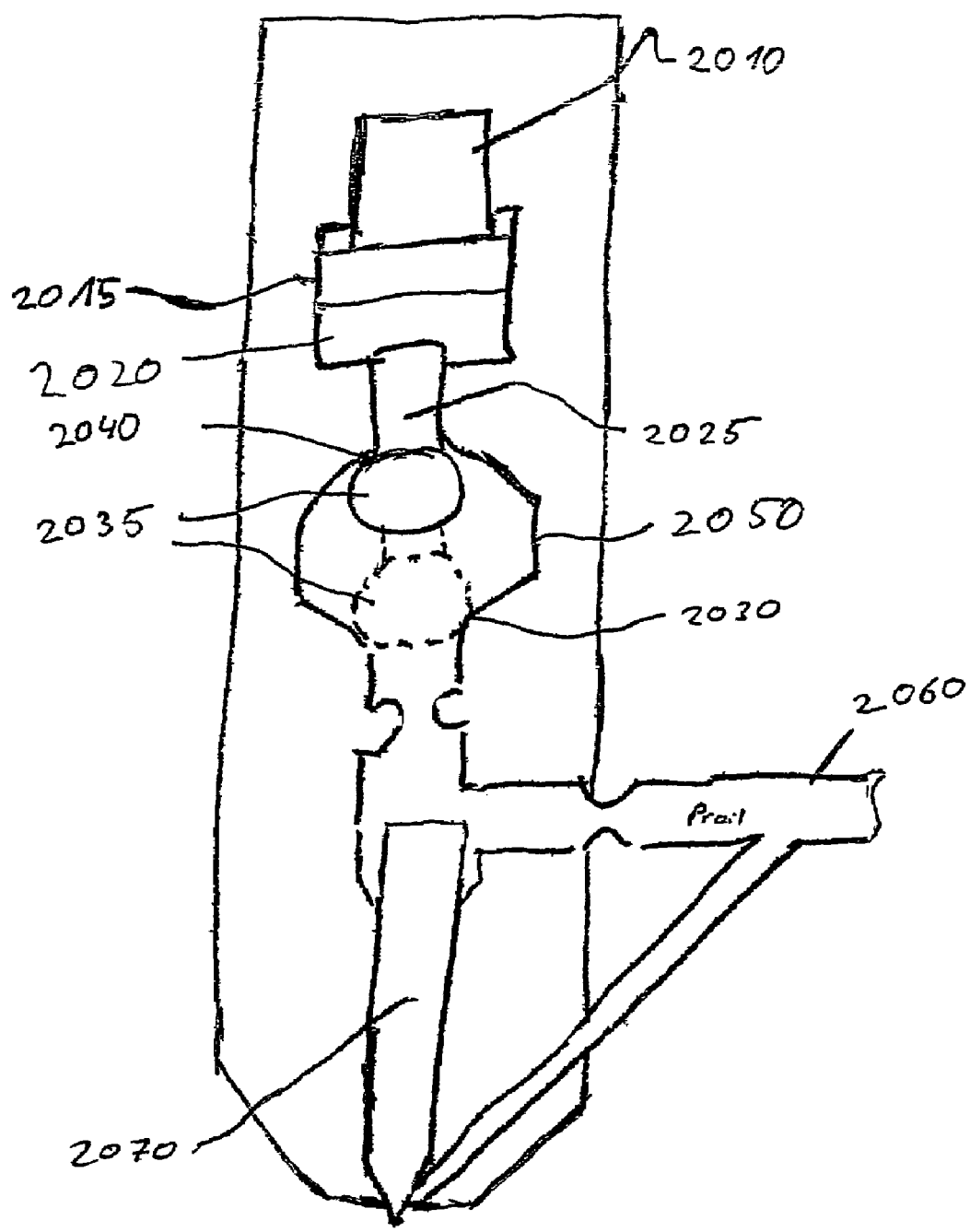
FIG. 15 shows a schematic representation of a fuel injection system using a piezoelectric element as an actuator.

A third embodiment of the present invention, as shown in FIG. 14, provides that the charge switch is switched back on in each case after a predefinable time following the excursion above the upper current threshold.

All activation variants allow for any desired variation in the activation time and activation current. All activation variants allow for gaps in the current, which thereby can contribute to a lower average current.

The time- and event-controlled activation system for piezoelectric elements or piezoactuators on which the present invention is based proves to be at least application-neutral as compared to the previously implemented purely event-controlled activation system. Depending on the embodiment and defined time and event characteristics, there may in fact be a cost advantage due to less complex implementation of the activation system in the activation IC.

Fundamentally, however, the present invention can make possible the implementation of freely selectable activation signals, greatly increasing the flexibility of the activation IC.

The present invention is readily apparent in terms of the product, since it guarantees the desired functionality.

The present invention, apparatus as defined in claim 1 or claim 2 and method as defined in claim 11 or claim 12 or claim 16 or claim 17, can be used in a variety of applications and are not necessarily limited to fuel injection systems. In fact, it is possible, that due to a less complex implementation of the activation system in the activation IC of the present invention, the present invention may provide a less expensive while more efficient and reliable alternative to prior methods.

In summary, it may therefore be stated that the apparatus and method according to the present invention make it possible to perform efficient charging and discharging of piezoelectric elements in simple and elegant fashion and even in confined spaces, in particular by achieving arbitrarily low average currents during the charging and discharging of piezoelectric elements.

The invention claimed is:

1. Apparatus for charging or discharging a piezoelectric element (1 and/or $11_1$, $12_1$, ... $1n_1$), characterized in that a current is regulated as a function of a time characteristic and an event characteristic to achieve an effective low average current.

2. Apparatus for charging or discharging a piezoelectric element (1 and/or $11_1$, $12_1$, ... $1n_1$) of a fuel injection system, characterized in that a current of the fuel injection system is regulated as a function of a time characteristic and an event characteristic to achieve an effective low average current.

3. Apparatus as according to claim 1, characterized in that the current is regulated by switching a charge or discharge switch (3, 5) as the function of the time characteristic and the event characteristic to achieve the effective low average current.

4. Apparatus as according to claim 1, characterized in that when the current is at a level below a predefined lower threshold, the charge switch remains open for a predefined time interval to allow the current to exhibit a gap.

5. Apparatus as according to claim 1, characterized in that a charge switch (3) or a discharge switch (5) of the apparatus is switched from an OFF position to an ON position or from the ON position to an OFF position, respectively to allow or stop charging or discharging when an absolute value of the current is respectively equal to or greater than or less than the event characteristic which is a predefined limit threshold current.

6. Apparatus as according to claim 1, characterized in that a charge or discharge switch (3, 5) of the apparatus is switched from the OFF position to the ON position to allow charging or discharging at a predefined time of the time characteristic after the absolute value of the current is equal to or less than the event characteristic which is a predefined lower limit threshold current.

7. Apparatus as according to claim 1, characterized in that a square-wave signal of a certain frequency is used to switch a charge or discharge switch (3, 5) from an OFF position to an ON position to allow charging or discharging.

8. Apparatus as according to claim 1, characterized in that the charge or discharge switch (3, 5) is switched from the ON position to the OFF position when the absolute value of the current is equal to or greater than the event characteristic which is a predefined limit threshold current.

9. Apparatus as according to claim 1, characterized in that a desired average current is achieved by varying the time characteristic and the event characteristic.

10. Apparatus as according to claim 1, characterized in that a time delay is predefined so that the charge or the discharge switch is switched to the ON position according to the predefined time delay, the predefined time delay being set to trigger when the absolute value of the current equals or is greater than a predefined current threshold.

11. Apparatus as according to claim 1, characterized in that the current is not regulated within a current band and exhibits gaps.

12. Method for charging a piezoelectric element in a system, characterized in that a current of the system is regulated as a function of a time characteristic and an event characteristic to achieve an effective low average current.

13. Method for charging or discharging a piezoelectric element of a fuel injection system, characterized in that a current of the fuel injection system is regulated as a function of a time characteristic and an event characteristic to achieve an effective low absolute average current.

14. Method as according to claim 12, characterized in that the charge or discharge switch (3, 5) of the system is switched from an OFF position to an ON position or from the ON position to an OFF position, respectively to allow or stop charging or discharging when an absolute value of the current is respectively equal to or greater than or less than the event characteristic which is a predefined limit threshold current.

15. Method as according to claim 12, characterized in that a charge or discharge switch (3, 5) of the system is switched from the OFF position to the ON position to allow charging or discharging at a predefined time of the time characteristic after the absolute value of the current is equal to or less than the event characteristic which is a predefined lower limit threshold current.

16. Method as according to claim 12, characterized in that a square-wave signal of a certain frequency is used to switch a charge or discharge switch (3, 5) from an OFF position to an ON position to allow charging or discharging and characterized in that the charge or discharge switch (3, 5) is switched from the ON position to the OFF position when the absolute value of the current is equal to or greater than the event characteristic which is a predefined upper limit threshold current.

17. Method for charging or discharging a piezoelectric element (1 and/or $11_1$, $12_1$, . . . $1n_1$) of a fuel injection system, characterized in that a definition is made, prior to charging or discharging, for an absolute value of the current for charging or discharging the piezoelectric element (1 and/or $11_1$, $12_1$, . . . $1n_1$) as a function of a time characteristic of the fuel injection system.

18. An apparatus for charging and discharging a piezoelectric element, comprising:
an arrangement configured to regulate a current as a function of a time characteristic and an event characteristic to achieve an effective low average current.

19. The apparatus according to claim 18, further comprising a charge switch and a discharge switch, the arrangement configured to switch the charge switch and the discharge switch as a function of the time characteristic and the event characteristic to achieve the effective low average current.

20. The apparatus according to claim 19, wherein the arrangement is configured to maintain the charge switch open for a predefined time interval to allow the current to exhibit a gap when the current is at a level below a predefined lower threshold.

21. The apparatus according to claim 19, wherein the event characteristic includes a predefined limit threshold current, the arrangement configured to switch the charge switch from an ON position to an OFF position to allow charging when an absolute value of the current is equal to or greater than the predefined limit threshold current and to switch the discharge switch from an ON position to an OFF position when the absolute value of the current is equal to or less than the predefined limit threshold current.

22. The apparatus according to claim 19, wherein the event characteristic includes a predefined lower limit threshold current, the arrangement configured to switch one of the charge switch and the discharge switch from an OFF position to an ON position and from an ON position to an OFF position to respectively allow and stop charging and discharging at a predefined time of the time characteristic after an absolute value of the current is equal to or less than the predefined lower limit threshold current.

23. The apparatus according to claim 19, wherein the arrangement is configured to switch one of the charge switch and the discharge switch from an OFF position to an ON position to respectively allow charging and discharging in accordance with a square-wave signal having a predetermined frequency.

24. The apparatus according to claim 19, wherein the event characteristic includes a predefined limit threshold current, the arrangement configured to switch one of the charge switch and the discharge switch from an ON position to an OFF position when an absolute value of the current is equal to or greater than the predefined limit threshold current.

25. The apparatus according to claim 18, wherein the arrangement is configured to vary the time characteristic and the event characteristic to achieve a desired average current.

26. The apparatus according to claim 19, wherein the arrangement is configured to predefine a time delay and to switch the charge switch and the discharge switch to an ON position in accordance with the time delay, the arrangement configured to predefine the time delay to trigger when an absolute value of the current is equal to or greater than a predefined current threshold.

27. The apparatus according to claim 18, wherein the current is not regulated within a current band and exhibits gaps.

28. An apparatus for charging and discharging a piezoelectric element of a fuel injection system, comprising:
an arrangement configured to regulate a current of the fuel injection system as a function of a time characteristic and an event characteristic to achieve an effective low average current.

29. The apparatus according to claim 28, wherein the fuel injection system includes a double acting control valve.

30. A method for charging a piezoelectric element in a system, comprising the step of:
regulating a current of the system as a function of a time characteristic and an event characteristic to achieve an effective low average current.

31. The method according to claim 30, wherein the event characteristic includes a predefined limit threshold current, the regulating step including the substep of selectively switching one of a charge switch and a discharge switch one of from an ON position to an OFF position and from an OFF position to an ON position to one of allow and stop a respective one of charging and discharging when an absolute value of the current is respectively equal to or greater than or less than the predefined limit threshold current.

32. The method according to claim 31, wherein the event characteristic includes a predefined lower limit threshold current, the regulating step including the substep of switching one of the charge switch and the discharge switch from the OFF position to the ON position to respectively allow charging and discharging at a predefined time of the time characteristic after the absolute value of the current is equal to or less than the predefined lower limit threshold current.

33. The method according to claim 31, wherein the event characteristic includes a predefined upper limit threshold current, the regulating step including the substeps of:

switching one of the charge switch and the discharge switch from the OFF position to the ON position to respectively allow charging and discharging in accordance with a square-wave signal having a predetermined frequency; and switching one of the charge switch and the discharge switch from the ON position to the OFF position when the absolute value of the current is equal to or greater than the predefined upper limit threshold current.

34. A method for charging and discharging a piezoelectric element of a fuel injection system, comprising the step of:

regulating a current of the fuel injection system as a function of a time characteristic and an event characteristic to achieve an effective low absolute average current.

35. The method according to claim 34, wherein the fuel injection system includes a double acting control valve.

36. A method for charging and discharging a piezoelectric element of a fuel injection system, comprising the steps of:

defining an absolute value of a current for one of charging and discharging the piezoelectric element as a function of a time characteristic of the fuel injection system; and one of charging and discharging the piezoelectric element after the defining step.

37. The method according to claim 36, wherein the fuel injection system includes a double acting control valve.

* * * * *